US010550774B1

(12) United States Patent
Blake

(10) Patent No.: US 10,550,774 B1
(45) Date of Patent: Feb. 4, 2020

(54) METHOD AND SYSTEM FOR DETECTING AND ADAPTING TO FUEL DIFFERENCES FOR AN ENGINE

(71) Applicant: Polaris Industries Inc., Medina, MN (US)

(72) Inventor: Dallas J. Blake, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/191,740

(22) Filed: Nov. 15, 2018

(51) Int. Cl.
*F02D 41/00* (2006.01)
*F02B 75/02* (2006.01)
*B62M 27/02* (2006.01)
*F02P 5/145* (2006.01)

(52) U.S. Cl.
CPC ......... *F02D 41/0025* (2013.01); *B62M 27/02* (2013.01); *F02B 75/02* (2013.01); *F02P 5/145* (2013.01); *B60Y 2200/252* (2013.01); *F02B 2075/025* (2013.01); *F02B 2700/03* (2013.01); *F02D 2200/0611* (2013.01); *F02D 2400/04* (2013.01)

(58) Field of Classification Search
CPC .... F02D 41/0025; F02D 19/00; F02D 35/027; F02D 2400/04; F02D 2200/0611; F02B 75/02; F02B 2075/025; F02B 2700/03; F02P 5/145; B62M 27/02; B60Y 2200/252

See application file for complete search history.

(56) References Cited

U.S. PATENT DOCUMENTS

| | | | | |
|---|---|---|---|---|
| 4,489,692 A | * | 12/1984 | Haraguchi | ............ F02P 5/1521 |
| | | | | 123/406.36 |
| 4,777,913 A | * | 10/1988 | Staerzl | .................... F02M 69/10 |
| | | | | 123/447 |
| 5,687,694 A | * | 11/1997 | Kanno | .................. F02B 61/045 |
| | | | | 123/478 |
| 2016/0238478 A1 | * | 8/2016 | Bizub | .................... G01L 23/227 |
| 2017/0122246 A1 | * | 5/2017 | Ottikkutti | ............. F02D 41/402 |

* cited by examiner

*Primary Examiner* — Grant Moubry
(74) *Attorney, Agent, or Firm* — Harness Dickey & Pierce

(57) ABSTRACT

A method and system for operating an engine includes operating the engine with a first plurality of parameters associated with a first fuel type, comparing a detonation signal a first to a first voltage threshold, forming a plurality of vectors by storing detonation signal values that exceed the first voltage threshold, in vectors as vector values wherein later in time vectors include previous vector values, summing vector values for each vector to form a plurality of sum values and when one of the plurality of sums values exceeds a sum threshold, changing an engine controller to operate with a second plurality of parameters associated with a second fuel type.

20 Claims, 13 Drawing Sheets

| TIME | 302.7 | 317.7 | 326.6 | 333.8 | 365.4 | 682.3 | 1112.7 | 1155 | 1263 | 1268.8 | 1388.1 |
|---|---|---|---|---|---|---|---|---|---|---|---|
| CYL1 VECTOR WITH TIME | 1.73 | 1.73 | 1.73 | 1.76 | 1.76 | 1.76 | 1.76 | 1.76 | 1.76 | 1.76 | 2.88 |
|  | 0 | 2.46 | 2.46 | 2.46 | 2.46 | 2.46 | 2.46 | 2.46 | 2.46 | 2.46 | 2.46 |
|  | 0 | 0 | 2.23 | 2.23 | 2.23 | 2.23 | 2.23 | 2.23 | 2.23 | 2.23 | 2.23 |
|  | 0 | 0 | 0 | 2.05 | 2.05 | 2.05 | 2.05 | 2.05 | 2.05 | 2.05 | 2.05 |
|  | 0 | 0 | 0 | 0 | 2.23 | 2.23 | 2.23 | 2.23 | 2.23 | 2.23 | 2.23 |
|  | 0 | 0 | 0 | 0 | 0 | 1.79 | 1.79 | 1.79 | 1.79 | 1.79 | 1.79 |
|  | 0 | 0 | 0 | 0 | 0 | 0 | 1.75 | 1.75 | 1.75 | 1.75 | 1.75 |
|  | 0 | 0 | 0 | 0 | 0 | 0 | 0 | 2.42 | 2.42 | 2.42 | 2.42 |
|  | 0 | 0 | 0 | 0 | 0 | 0 | 0 | 0 | 1.95 | 1.95 | 1.95 |
|  | 0 | 0 | 0 | 0 | 0 | 0 | 0 | 0 | 0 | 1.88 | 1.88 |

FIG. 9

| TIME | 159.7 | 224.3 | 297.1 | 321.1 | 323.4 | 327.2 | 336.8 | 575.4 | 672.1 | 1172.1 | 1185.6 | 1212.4 |
|---|---|---|---|---|---|---|---|---|---|---|---|---|
| CYL2 VECTOR WITH TIME | 1.83 | 1.83 | 1.83 | 1.83 | 1.83 | 1.83 | 1.83 | 1.83 | 1.83 | 0 | 0 | 1.88 |
|  | 0 | 1.84 | 1.84 | 1.84 | 1.84 | 1.84 | 1.84 | 1.84 | 1.84 | 1.84 | 1.84 | 1.84 |
|  | 0 | 0 | 1.8 | 1.8 | 1.8 | 1.8 | 1.8 | 1.8 | 1.8 | 1.8 | 1.8 | 1.8 |
|  | 0 | 0 | 0 | 1.72 | 1.72 | 1.72 | 1.72 | 1.72 | 1.72 | 1.72 | 1.72 | 1.72 |
|  | 0 | 0 | 0 | 0 | 1.78 | 1.78 | 1.78 | 1.78 | 1.78 | 1.78 | 1.78 | 1.78 |
|  | 0 | 0 | 0 | 0 | 0 | 2.19 | 2.19 | 2.19 | 2.19 | 2.19 | 2.19 | 2.19 |
|  | 0 | 0 | 0 | 0 | 0 | 0 | 1.72 | 1.72 | 1.72 | 1.72 | 1.72 | 1.72 |
|  | 0 | 0 | 0 | 0 | 0 | 0 | 0 | 1.95 | 1.95 | 1.95 | 1.95 | 1.95 |
|  | 0 | 0 | 0 | 0 | 0 | 0 | 0 | 0 | 1.95 | 1.95 | 1.95 | 1.95 |
|  | 0 | 0 | 0 | 0 | 0 | 0 | 0 | 0 | 0 | 0 | 2.33 | 2.33 |

FIG. 11

| TIME | 0 | 159.7 | 224.3 | 297.1 | 302.7 | 317.7 | 321.1 | 323.4 | 326.6 | 327.2 | 333.8 | 336.8 |
|---|---|---|---|---|---|---|---|---|---|---|---|---|
| MAG VECTOR WITH TIME | 0 | 0 | 0 | 0 | 1.73 | 1.76<br>2.46 | 1.76<br>2.46 | 1.76<br>2.46 | 1.76<br>2.46<br>2.23 | 1.76<br>2.46<br>2.23 | 1.76<br>2.46<br>2.23<br>2.05 | 1.76<br>2.46<br>2.23<br>2.05 |
|  | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 |
| MAG SUM | 0 | 0 | 0 | 0 | 1.73 | 4.19 | 4.19 | 4.19 | 6.42 | 6.42 | 8.5 | 8.5 |
| PTO VECTOR WITH TIME | 0 | 1.83 | 1.83<br>1.84 | 1.83<br>1.84<br>1.8 | 1.83<br>1.84<br>1.8 | 1.83<br>1.84<br>1.8 | 1.83<br>1.84<br>1.8<br>1.72 | 1.83<br>1.84<br>1.8<br>1.72<br>1.78 | 1.83<br>1.84<br>1.8<br>1.72<br>1.78 | 1.83<br>1.84<br>1.8<br>1.72<br>1.78<br>2.19 | 1.83<br>1.84<br>1.8<br>1.72<br>1.78<br>2.19<br>1.72 | 1.83<br>1.84<br>1.8<br>1.72<br>1.78<br>2.19<br>1.72 |
|  | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 |
| PTO SUM | 0 | 1.83 | 3.67 | 5.47 | 5.47 | 5.47 | 7.19 | 8.97 | 8.97 | 11.16 | 11.16 | 12.88 |
| TIME | 0 | 1.83 | 3.67 | 5.47 | 7.2 | 9.66 | 11.38 | 13.16 | 15.39 | 17.58 | 19.66 | 21.38 |

FIG. 12A

| 365.4 | 575.4 | 672.1 | 682.3 | 1112.7 | 1155 | 1172.1 | 1185.6 | 1212.4 | 1263 | 1268.8 | 1388.1 | 4500 |
|---|---|---|---|---|---|---|---|---|---|---|---|---|
| 1.76 | 1.76 | 1.76 | 1.76 | 1.76 | 1.76 | 1.76 | 1.76 | 1.76 | 1.76 | 1.76 | 1.76 | 2.88 |
| 2.46 | 2.46 | 2.46 | 2.46 | 2.46 | 2.46 | 2.46 | 2.46 | 2.46 | 2.46 | 2.46 | 2.46 | 2.46 |
| 2.23 | 2.23 | 2.23 | 2.23 | 2.23 | 2.23 | 2.23 | 2.23 | 2.23 | 2.23 | 2.23 | 2.23 | 2.23 |
| 2.05 | 2.05 | 2.05 | 2.05 | 2.05 | 2.05 | 2.05 | 2.05 | 2.05 | 2.05 | 2.05 | 2.05 | 2.05 |
| 2.23 | 2.23 | 2.23 | 2.23 | 2.23 | 2.23 | 2.23 | 2.23 | 2.23 | 2.23 | 2.23 | 2.23 | 2.23 |
| 0 | 0 | 0 | 0 | 1.79 | 1.79 | 1.79 | 1.79 | 1.79 | 1.79 | 1.79 | 1.79 | 1.79 |
| 0 | 0 | 0 | 0 | 0 | 1.75 | 1.75 | 1.75 | 1.75 | 1.75 | 1.75 | 1.75 | 1.75 |
| 0 | 0 | 0 | 0 | 0 | 0 | 2.42 | 2.42 | 2.42 | 2.42 | 2.42 | 2.42 | 2.42 |
| 0 | 0 | 0 | 0 | 0 | 0 | 0 | 0 | 0 | 0 | 1.95 | 1.95 | 1.95 |
| 0 | 0 | 0 | 0 | 0 | 0 | 0 | 0 | 0 | 0 | 0 | 1.88 | 1.88 |
| 10.73 | 10.73 | 10.73 | 12.52 | 14.27 | 16.69 | 16.69 | 16.69 | 16.69 | 18.64 | 20.52 | 21.64 | 21.64 |
| 1.83 | 1.83 | 1.83 | 1.83 | 1.83 | 1.83 | 0 | 0 | 1.88 | 1.88 | 1.88 | 1.88 | 1.88 |
| 1.84 | 1.84 | 1.84 | 1.84 | 1.84 | 1.84 | 1.84 | 1.84 | 1.84 | 1.84 | 1.84 | 1.84 | 1.84 |
| 1.8 | 1.8 | 1.8 | 1.8 | 1.8 | 1.8 | 1.8 | 1.8 | 1.8 | 1.8 | 1.8 | 1.8 | 1.8 |
| 1.72 | 1.72 | 1.72 | 1.72 | 1.72 | 1.72 | 1.72 | 1.72 | 1.72 | 1.72 | 1.72 | 1.72 | 1.72 |
| 1.78 | 1.78 | 1.78 | 1.78 | 1.78 | 1.78 | 1.78 | 1.78 | 1.78 | 1.78 | 1.78 | 1.78 | 1.78 |
| 2.19 | 2.19 | 2.19 | 2.19 | 2.19 | 2.19 | 2.19 | 2.19 | 2.19 | 2.19 | 2.19 | 2.19 | 2.19 |
| 1.72 | 1.72 | 1.72 | 1.72 | 1.72 | 1.72 | 1.72 | 1.72 | 1.72 | 1.72 | 1.72 | 1.72 | 1.72 |
| 0 | 1.95 | 1.95 | 1.95 | 1.95 | 1.95 | 1.95 | 1.95 | 1.95 | 1.95 | 1.95 | 1.95 | 1.95 |
| 0 | 0 | 0 | 0 | 0 | 0 | 0 | 0 | 0 | 0 | 0 | 0 | 0 |
| 0 | 0 | 0 | 0 | 0 | 0 | 0 | 2.33 | 2.33 | 2.33 | 2.33 | 2.33 | 2.33 |
| 12.88 | 14.83 | 16.78 | 16.78 | 16.78 | 16.78 | 14.95 | 17.28 | 19.16 | 19.16 | 19.16 | 19.16 | 19.16 |
| 23.61 | 25.56 | 27.51 | 29.3 | 31.05 | 33.47 | 31.64 | 33.97 | 35.85 | 37.8 | 39.68 | 40.8 | 40.8 |

FIG. 12B

METHOD AND SYSTEM FOR DETECTING AND ADAPTING TO FUEL DIFFERENCES FOR AN ENGINE

FIELD

The present disclosure relates to a vehicle engine and, more particularly, to a method of detecting different fuels and adapting the operation of the engine therefor.

BACKGROUND

This section provides background information related to the present disclosure which is not necessarily prior art.

A vehicle, such as a snowmobile, generally includes an engine assembly. The engine assembly is operated with the use of fuel to generate power to drive the vehicle. The power to drive a snowmobile is generally generated by a combustion engine that drives pistons and a connected crankshaft. Two-stroke snowmobile engines are highly tuned, and high specific power output engines that operate under a wide variety of conditions.

The modern two-stroke snowmobile engine must be able to operate at peak performance in ambient air temperatures of −40 to 100 F and from sea level to 12000 ft in elevation. Consumer expectations of snowmobile engines, especially two-stroke engines have increased substantially as customer's desire increased engine life and improved run quality compared to previous generations of snowmobiles.

The range of fuel octane and ethanol content combinations have created a new set of challenges in the development and calibration of 2-stroke snowmobile engines. During previous generations of snowmobile engines, the most common fuels encountered by customers was 91 octane with no ethanol (91E0) and 87 octane with 10% ethanol (87E10). However, over the last several years, the presence of 91 octane with 10% ethanol (91E10) has increased significantly, as has the proliferation of 5-7% ethanol blends of all octane levels. Each of these octane and ethanol combination creates slightly different calibration requirements; for example, 87E10 requires both ignition retard and a fuel increase compared to a 91E0. A calibration optimized for 91E0 will see increased detonation and/or power limiting control when run on 87E10 whereas an 87E10 optimized calibration will suffer poor performance when run on 91E0 fuel. The 91E10 and 5-7% ethanol blends complicates matter further as the fueling requirements fall in between the 91E0 and 87E10 boundaries.

To alleviate the difference in calibration needed between a 91E0 and 87E10 fuel, Polaris snowmobiles feature a fuel setting mode done through the vehicle gauge. This fuel setting mode applies an ignition and fuel offset to certain RPM and TPS brake points to accommodate the different fuel types. However, since this setting is user controlled, there is potential for the user to select the wrong fuel setting. This happens can happen in two ways; the first being the user selecting the premium/non ethanol (91E0) setting thinking they are getting maximum performance while the second is the user selecting the non-premium/ethanol (87E0) setting thinking they are doing everything they can to protect the engine, at the expense of performance. However, testing has shown that using the wrong fuel setting can lead to performance and durability problems.

SUMMARY

This section provides a general summary of the disclosures, and is not a comprehensive disclosure of its full scope or all of its features.

In one aspect of the disclosure, a method and system for operating an engine includes operating the engine with a first plurality of parameters associated with a first fuel type, comparing a detonation signal a first to a first voltage threshold, forming a plurality of vectors by storing detonation signal values that exceed the first voltage threshold, in vectors as vector values wherein later in time vectors include previous vector values, summing vector values for each vector to form a plurality of sum values and when one of the plurality of sums values exceeds a sum threshold, changing an engine controller to operate with a second plurality of parameters associated with a second fuel type.

In another aspect of the disclosure, a method of operating an engine includes operating an engine with a first plurality of parameters associated with a first fuel type forming a first plurality of vectors associated with a first cylinder by storing vector values based on a detonation signal that exceed a voltage threshold in the first plurality of vectors wherein later in time vectors include previous vector values, each of the first vectors associated having a time associated therewith, forming a second plurality of vectors associated with a second cylinder by storing vector values based on the detonation signal that exceed the voltage threshold in the plurality of second vectors wherein later in time vectors include previous vector values, associating the first plurality of vectors and the second plurality of vectors based on time to form associated pairs, summing vector values in the associated pairs form a plurality of sums, when one of the plurality of sums values exceeds a sum threshold, changing an engine controller to operate with a second plurality of parameters associated with a second fuel type.

In another aspect of the disclosure, an engine control system comprises a detonation sensor generating a detonation signal, a controller coupled to the detonation sensor, said controller programmed to operate an engine with a first plurality of parameters associated with a first fuel type, form a first plurality of vectors associated with a first cylinder by storing vector values based on the detonation signal that exceed a voltage threshold in the first plurality of vectors wherein later in time vectors include previous vector values, each of the first vectors associated having a tie associated therewith, form a second plurality of vectors associated with a second cylinder by storing vector values based on the detonation signal that exceed the voltage threshold in the plurality of second vectors wherein later in time vectors include previous vector values, associate the first plurality of vectors and the second plurality of vectors based on time to form associated pairs, sum vector values in the associated pairs form a plurality of sum values and change the engine controller to switch to a second plurality of parameters associated with a second fuel type when one of the plurality of sum values exceeds a sum threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

FIG. 9 is a chart illustrating vectors for the detonation events exceeding the threshold for the first cylinder illustrated in FIG. 8.

FIG. 11 is a chart illustrating vectors for the detonation events exceeding the threshold for the second cylinder illustrated in FIG. 10.

FIGS. 12A and 12B is a combined chart for various events for the first cylinder and the second cylinder.

DETAILED DESCRIPTION

Figure 1:
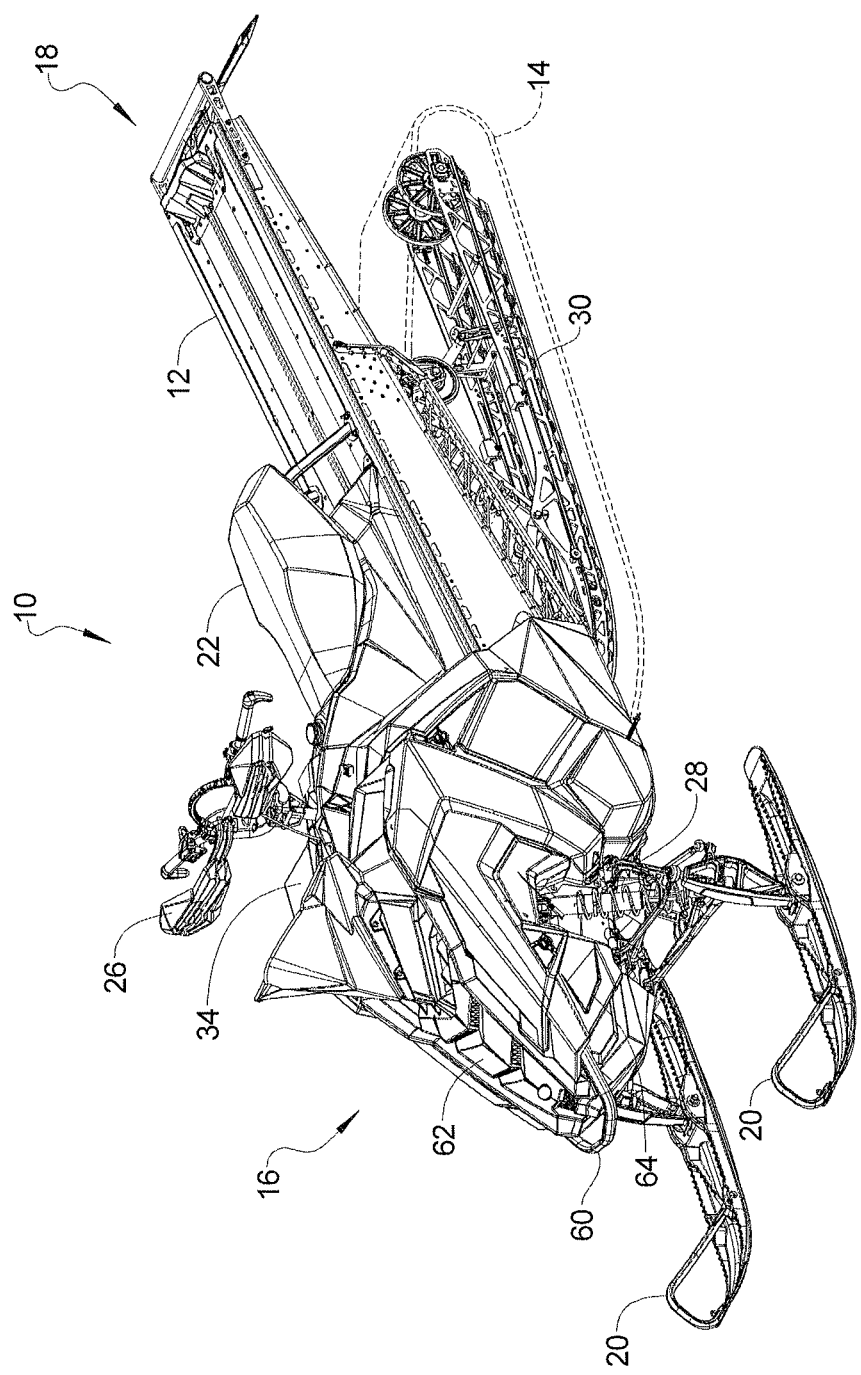
FIG. 1 is a perspective view of a snowmobile.
Figure 2A:
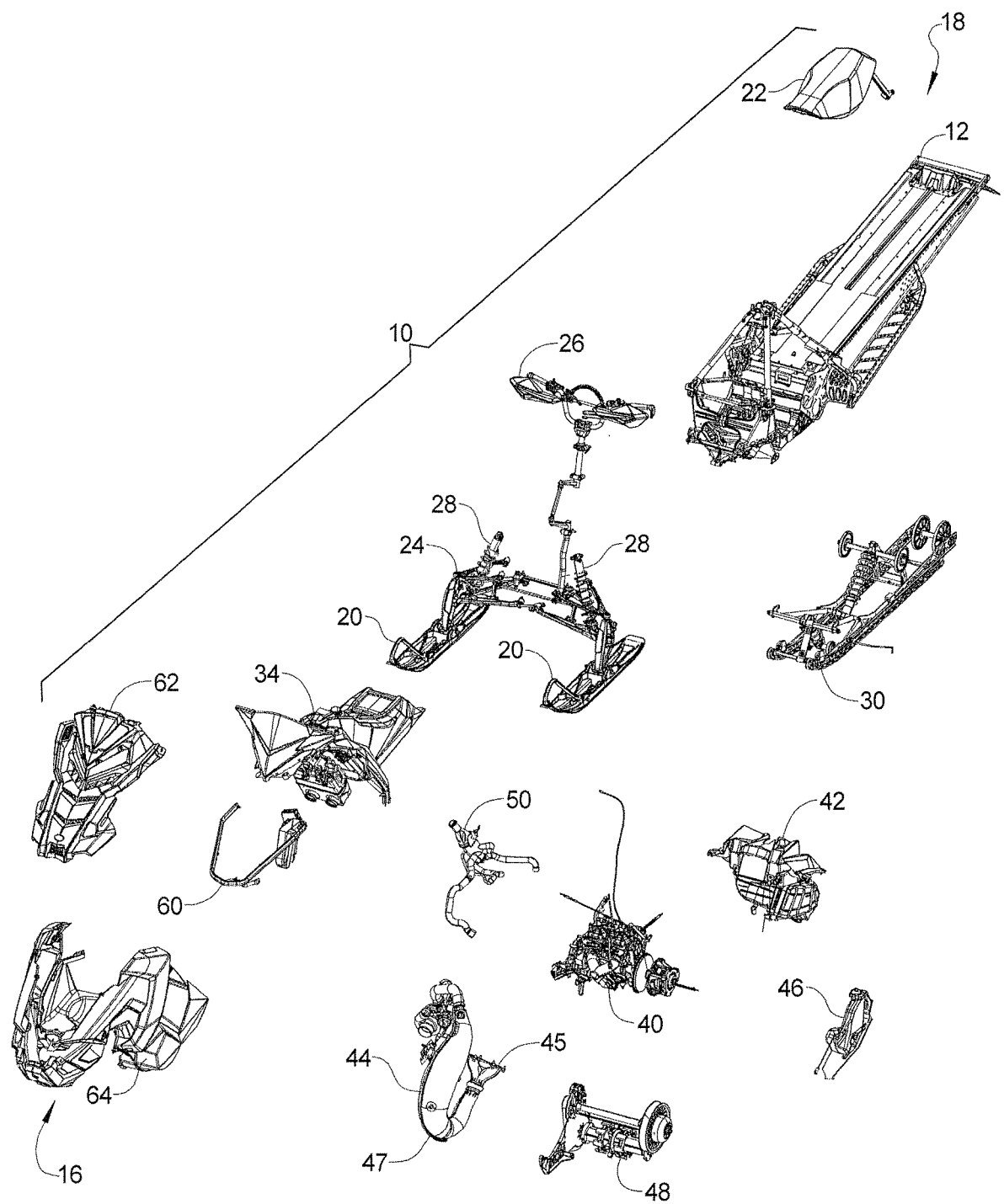
FIG. 2A is an exploded view of the snowmobile of FIG. 1.
Figure 2B:
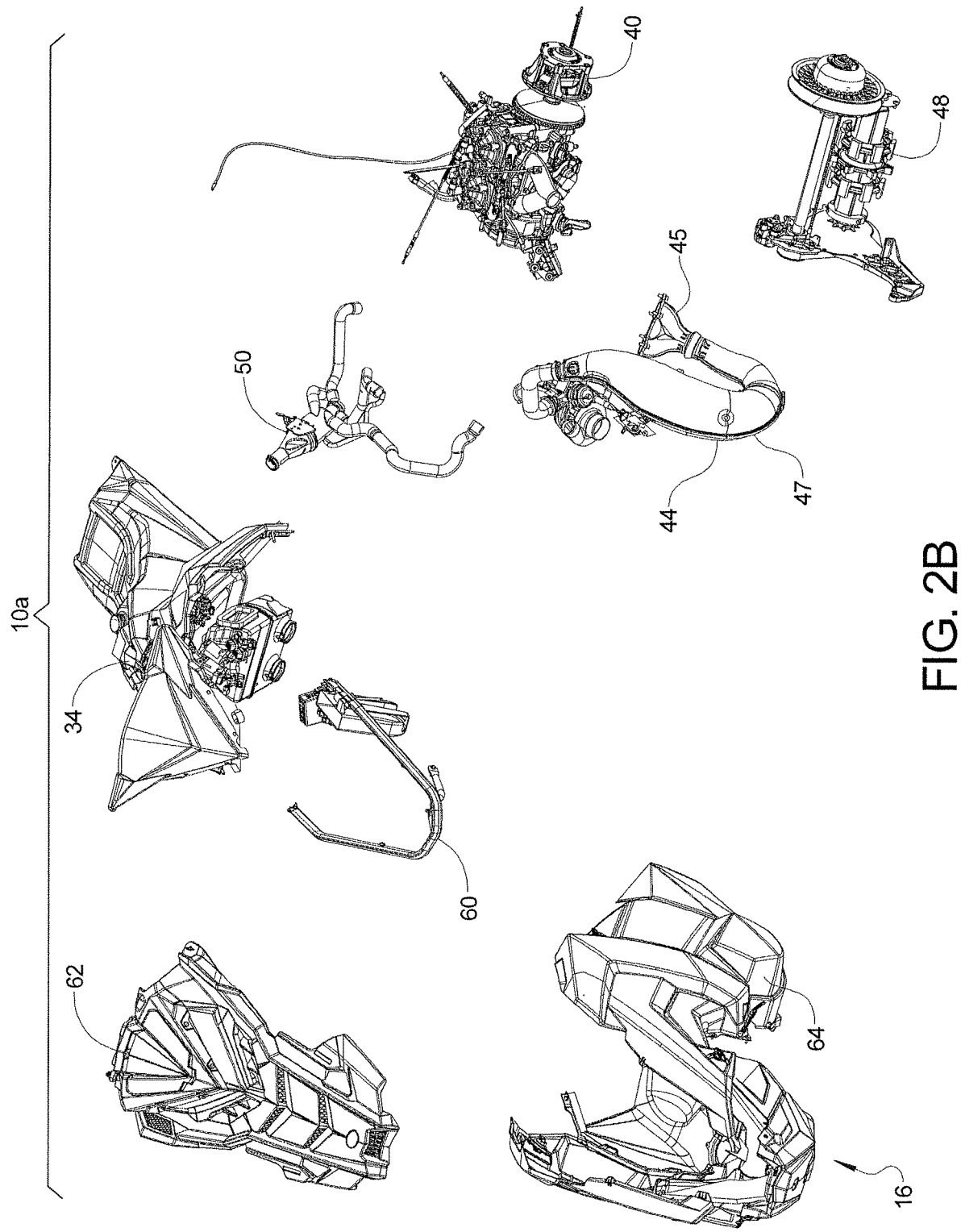
FIGS. 2B and 2C are enlarged exploded views of FIG. 2.
Figure 2C:
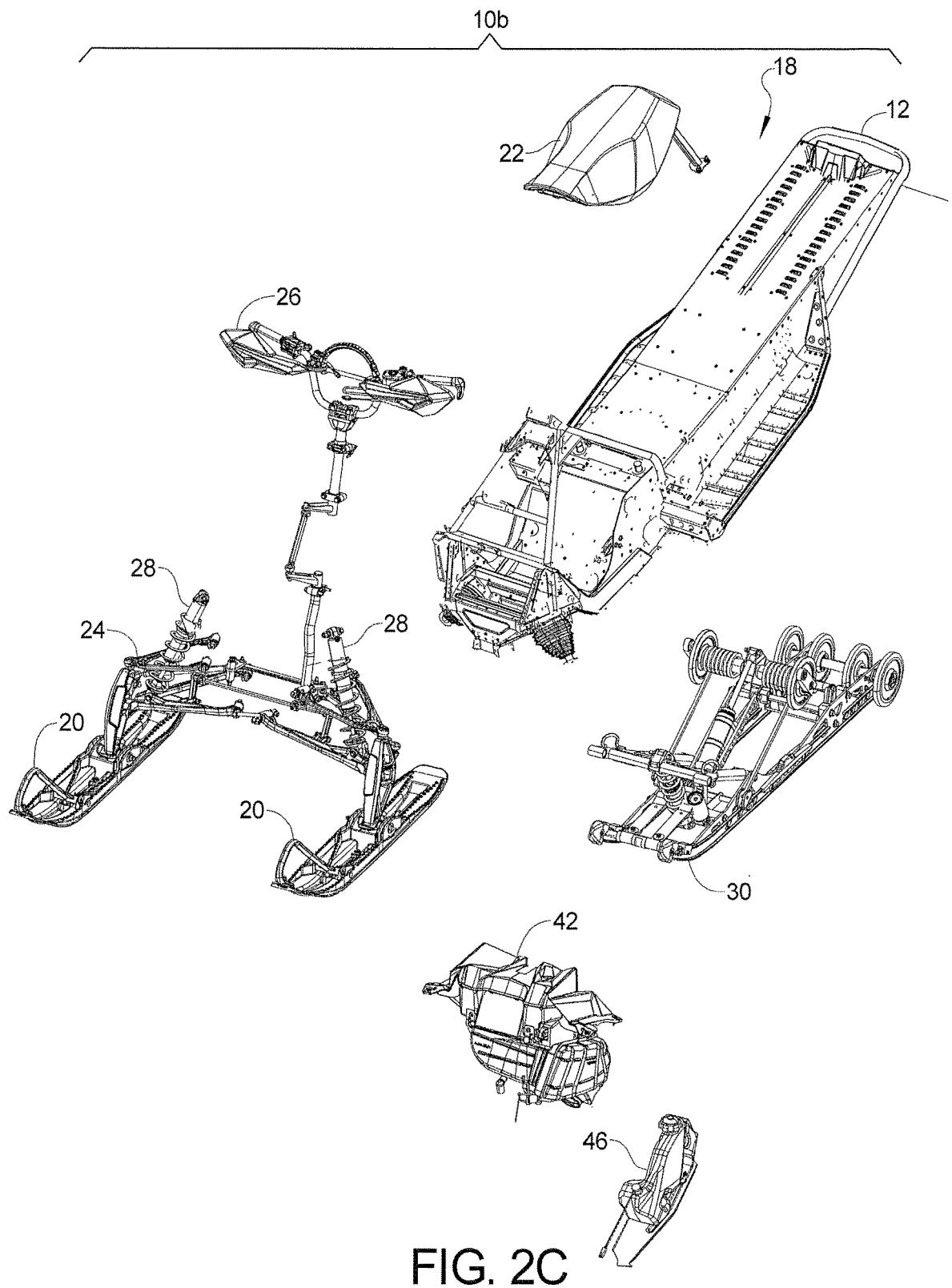

Examples will now be described more fully with reference to the accompanying drawings. Although the following description includes several examples of a snowmobile application, it is understood that the features herein may be applied to any appropriate vehicle, such as motorcycles, all-terrain vehicles, utility vehicles, mopeds, scooters, etc. The examples disclosed below are not intended to be exhaustive or to limit the disclosure to the precise forms disclosed in the following detailed description. Rather, the examples are chosen and described so that others skilled in the art may utilize their teachings.

The term vector is used in the following document. A vector is a group of associated values. Physically a vector or vector portions may be stored in one physical location. A vector may have vector portions that may be combined with other vector portions to form one physical vector. Thus, a plurality of vector portions may be in one vector. The vectors set forth below may be discrete and separate vectors or vector portions which form a single vector.

Referring now to FIG. 1 and FIGS. 2A-2C, one example of an exemplary snowmobile 10 is shown. Snowmobile 10 includes a chassis assembly 12, an endless belt assembly 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include handlebars 26 for steering, shock absorbers 28 and the front skis 20. A rear suspension assembly 30 is also coupled to the chassis assembly 12. The rear suspension assembly 30 may be used to support the endless belt assembly 14 for propelling the vehicle. An electrical console assembly 34 is also coupled to the chassis assembly 12. The electrical console assembly 34 may include various components for displaying engine conditions (i.e., gauges) and for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. An oil tank assembly 46 is used for providing oil to the engine for lubrication and for mixing with the fuel in the intake assembly 42. In other systems oil and fuel may be mixed directly in the engine. A drivetrain assembly 48 is used for converting the rotating crankshaft assembly from within the engine assembly 40 into a potential force to use the endless belt assembly 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3:
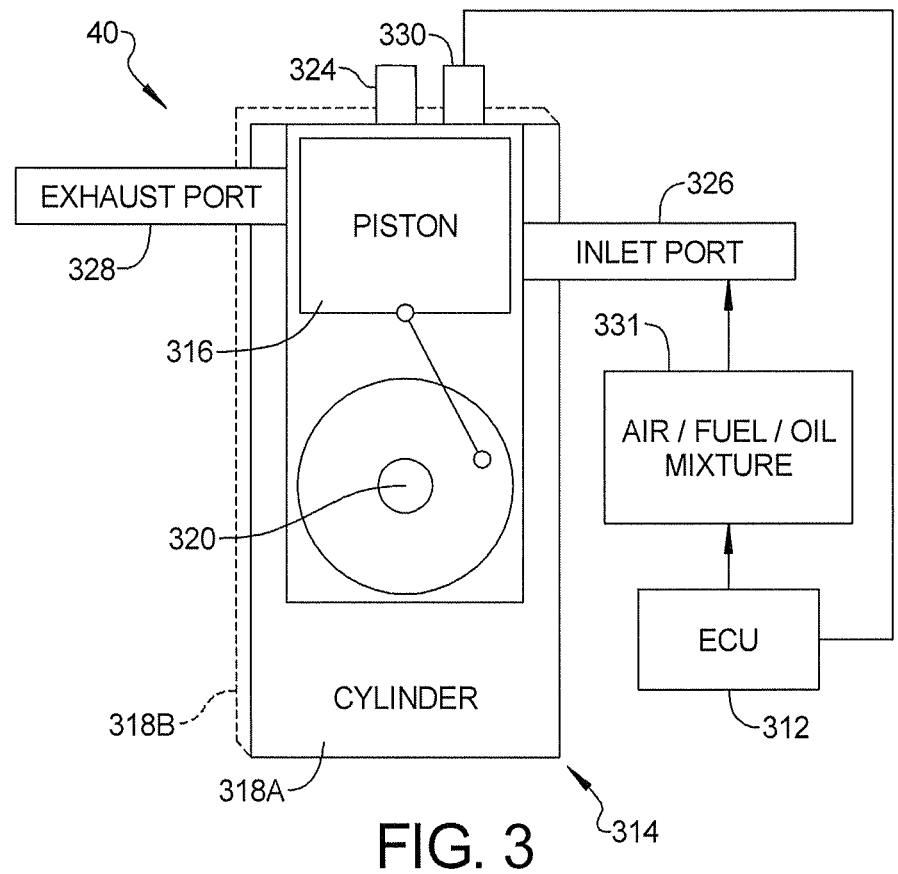
FIG. 3 is a simplified block diagrammatic view of an engine assembly.

Referring now to FIG. 3, the engine assembly 40 is illustrated having an engine control unit (ECU) 312 for controlling the operation of an engine 314. The engine 314 has at least one cylinder 318A. The second cylinder 318B is aligned therethrough and is illustrated by the dotted box. The second cylinder 318B is positioned differently and operates with the same crankshaft 20. In the following example the engine 314 may, for example, have two cylinders 318A and 318B. In this example the engine 314 is a two-stroke engine. The cylinder 318 includes at least one piston 316 movable within a cylinder 318. The piston 316 is connected to a crankshaft 320 by connecting arm 322 in a conventional manner. A spark plug 324 provides ignition to drive the piston 316. An inlet port 326 and an exhaust port 328 are provided for each cylinder 318A, 318B. An air, fuel and oil mixture is provided in a conventional manner through the inlet port 326. The air, fuel and oil mixture is controlled by the various components of the engine 314 and in response to the ECU 312. The air, fuel and oil mixture is illustrated in block 331.

The engine 314 may also include a knock or detonation sensor 330. The detonation sensor 330 may be an acoustic sensor such is that normally found in various types of engines. The detonation sensor 330 generates a detonation signal output corresponding to sensed vibrations. The detonation sensor 330 is in communication with the ECU 312. In this case, the detonation sensor 330 is mounted within the head. More particularly, the detonation sensor 330 may be mounted between two pistons. As will be described below, the detonation sensor 330 is typically used to change calibration of the engines. However, the detonation sensor 330, in this case, is used for determining which fuel map is to be used instead of manual selection by a vehicle operator.

Figure 4:
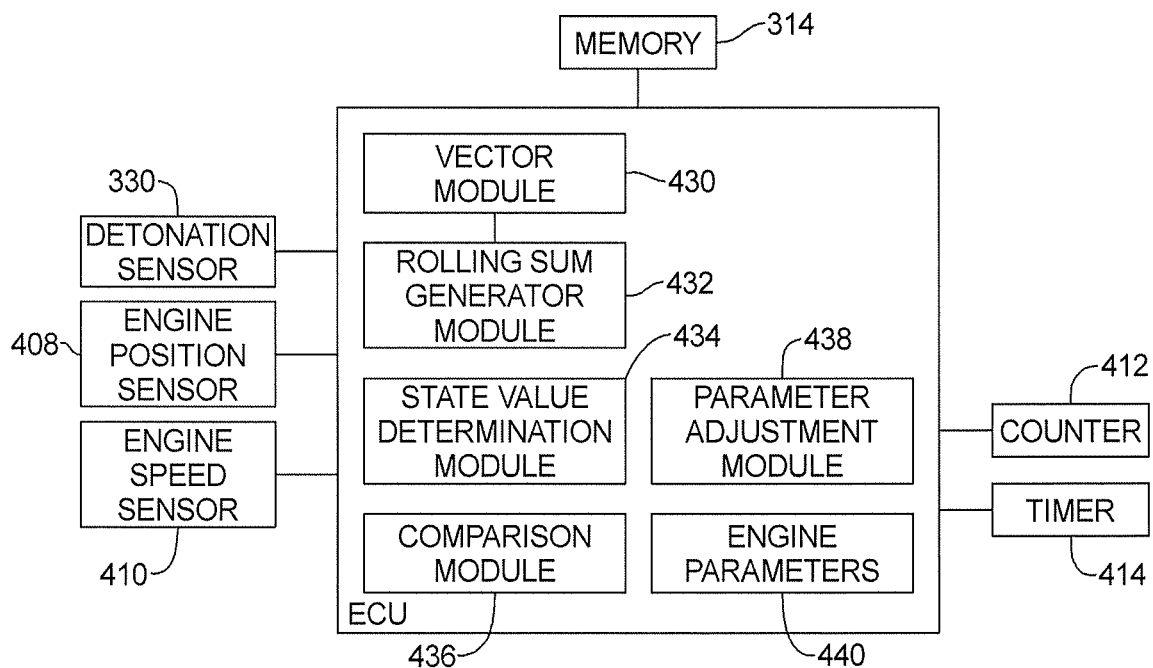
FIG. 4 is a block diagrammatic view of the engine control unit.

Referring now to FIGS. 3 and 4, the ECU 312 is illustrated in further detail. The ECU 312 is coupled to a memory 314 for storing various vector events in predetermined slots and thresholds such as time thresholds. The ECU 312 is in communication with the detonation sensor 330 and the engine speed sensor 410. The engine speed sensor 410 may generate a signal corresponding to the rotational speed of the crankshaft 320 of the engine 314.

An engine position sensor 408 communicates a position signal corresponding to a position of the crankshaft 320. The position signal is used as a timing signal to determine the cylinder that is associated with a detonation event.

A counter 412 and a timer 414 may be coupled to the ECU 312 or may be incorporated within the ECU 312. The counter 412 may be used for counting various items such as the number of vector events. The timer 414 also sets the time since the beginning of the events such as when the engine 314 was started or a time since a last event. That is, the timer 414 may be used to form a rolling window. The timer 414 may provide a reference time for each of the vector events so that they may be placed in time order as described in more detail below.

The ECU 312 may include a vector module 430 that is used for generating vectors according to the present disclosure. The vectors are generated when the signal from the detonation sensor 330 exceeds a threshold. The engine 314 used for this example has two cylinders 318. That is, the engine 314 may be a two-stroke two cylinder engine. The time of the knock or detonation event sensed by the detonation detector may be associated with one of the two cylinders 318. The time in seconds from the starting of the engine 314 may be associated with a vector as well as a voltage associated with the detonation sensor 330. However, time may not be stored within the vectors. In the following example, the vector may include a variable number of slots. In the following case ten slots are associated with each vector. The vector module 430 builds vectors over time by inserting a new vector event within a slot while maintaining the previous voltage value. Over time, the number of slots fill and older events are overwritten.

In the state value determination module 434 the compiling and tracking the different vectors may be performed. Old vector values may be removed. That is, vector values that are over predetermined times may be removed from the vector slots and ultimately filled the slots are filled with new voltage events from the detonation sensor 330.

A comparison module 436 compares the sum from the different cylinders 318. As will be described further below vector values of time associated pairs may be summed. When the sum is greater than a sum threshold an engine parameter may be changed.

A parameter adjustment module 438 adjusts the parameters of the engine 314 when the comparison module 436 determines a sum is greater than a sum threshold. In some examples, the engine parameters may be adjusted. The engine parameters may correspond to a map for use with a first fuel type. When the sum is greater than the sum threshold, the engine parameters used may correspond or may be switched to a second set of engine parameters. In one example, a first map may be changed to a second map.

The engine parameters module 440 controls the various control functions such as those set forth in block 331 by setting the air, fuel and oil mixtures as well as the timing of them to obtain the desired engine performance. That is, ignition and fuel offsets may be applied to the values to allow the engine to improve the operation of the engine 314.

Figure 5:
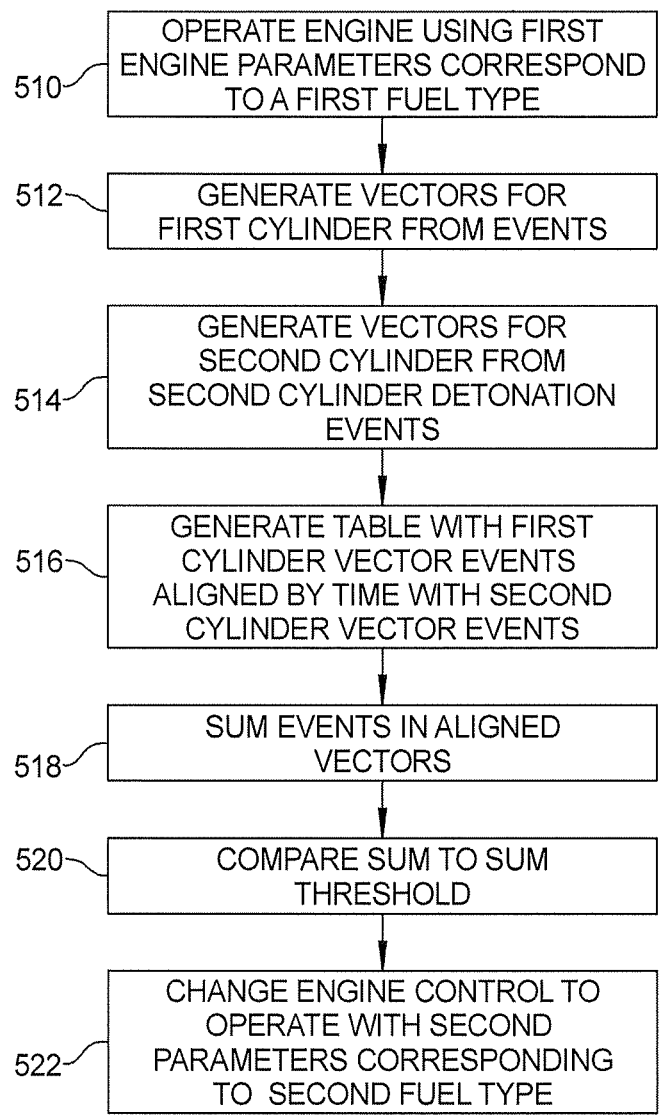
FIG. 5 is a high level flowchart of a method for operating the system.

Referring now to FIG. 5, a high level flowchart of a method for operating the engine 314 with various engine parameters is set forth. In step 510 the engine 314 is operated with a first set of parameters that correspond to a first fuel type. The parameters may be disposed in an engine parameter map the first set of parameters may correspond to a higher octane fuel.

In step 512, vectors for a first cylinder 318A derived from the first cylinder detonation events is generated. Vectors for a second cylinder corresponding to second cylinder detonation events are generated in step 514. In step 516 a table with first cylinder vector events in slots associated by time with second cylinder vector event is generated. The associated table vectors are summed. As will be described and illustrated below, detonation events are sequentially ordered. Events are recorded according to time and each first cylinder event vector is associated with the previous event vector or from the other cylinder. The sum of the first cylinder vector slots and the second cylinder vector slots are determined in step 518. In step 520 the sum is compared to a sum threshold. When the sum is greater than the sum threshold, step 522 changes the engine control to operate with second parameters corresponding to a second fuel type.

In step 620 the position of the pistons are monitored by monitoring the engine position sensor 408. The engine position sensor 408 monitors the position of the combustion events so that the combustion events can be associated with the first cylinder or the second cylinder. That is, the detonation events are detected by the detonation sensor 330 and thus the position of each detonation event may be correlated with the first piston or the second piston based upon the engine position (which in turn corresponds to the engine timing).

In step 612 the voltage signal from the detonation sensor 330 is monitored. In step 614 it is determined by using the engine timing determined in step 610 whether the position of the engine 314 corresponds to detonation of the first cylinder 318A or the second cylinder 318B. If the detonation event corresponds to the first cylinder 318A, step 616 is performed. If the detonation sensor voltage is greater than the detonation threshold in step 618, the event is added to the first cylinder vector. Both the time of the detonation event and the voltage for the detonation sensor 330 are added to the detonation table (e.g. FIG. 9 and FIG. 16). After step 618 and when there is no detonation sensor voltage greater than the detonation threshold step 620 is performed. In step 620 a vector event value older than a timing threshold is determined. That is, old detonation events within the detonation table are determined. To be old when the events are more than a predetermined time before the current event. In step 620 when vector values are greater than the timing threshold the vector value that is "old" is replaced with zero in step 622. Ultimately, the zero value may be overwritten by a current event.

After steps 622 and when step 620 is a "No", step 610 is again performed.

Referring back to step 614, when the timing corresponds to the second cylinder step 630 determines whether the detonation sensor voltage is greater than the detonation threshold. In step 632 the detonation event is added to the second cylinder vector. As mentioned earlier this step is similar to step 618 and zero values are replaced if present.

In step 634 if the vector values within the table are greater than a timing threshold, step 610 is performed. After step 634 if vector values are greater than the timing threshold step 636 replaces the vector values with zero values. In step 634 and step 620 when the vector events are not older than the timing threshold, step 610 is again performed.

Figure 6:
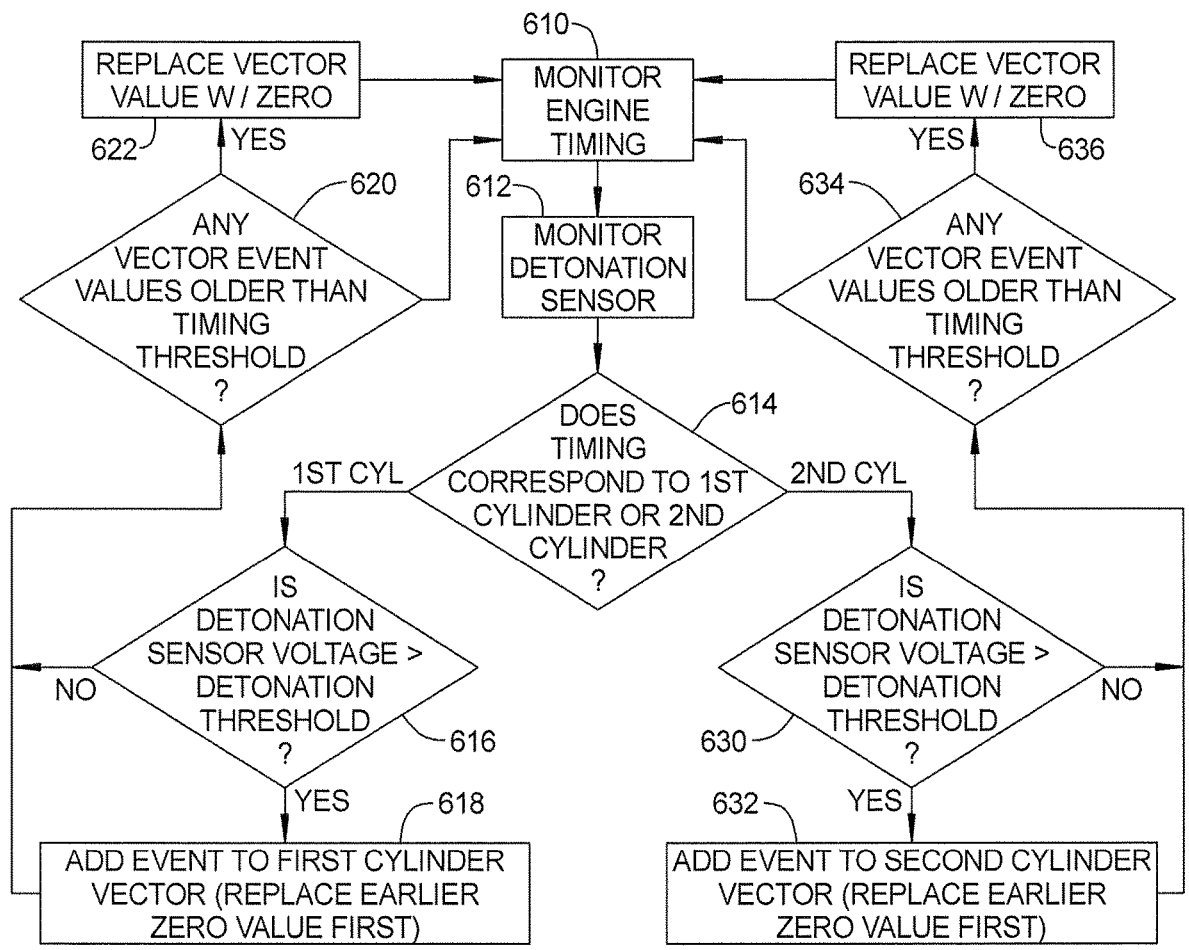
FIG. 6 is a detailed flowchart illustrating the comparison of detonation events to a threshold.
Figure 7:
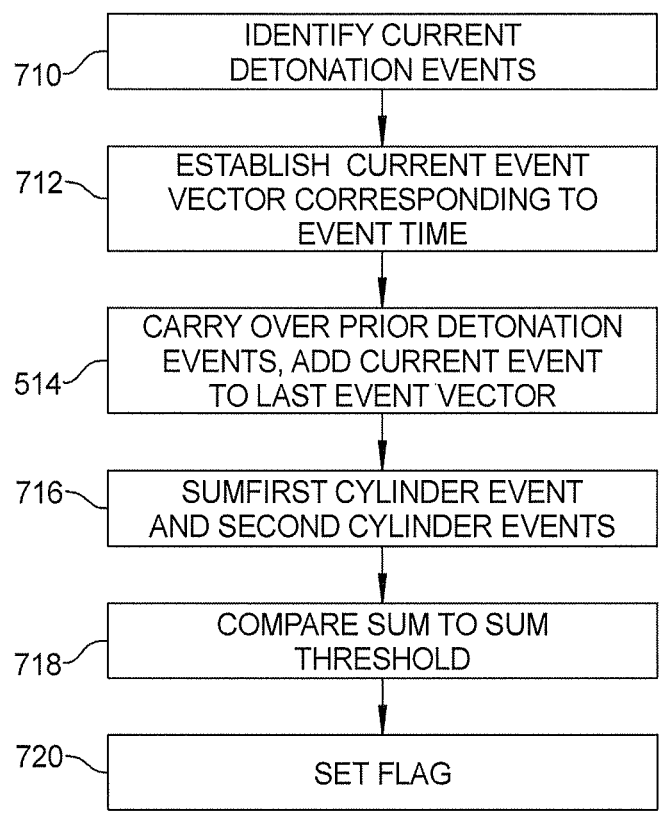
FIG. 7 is a flowchart of a method for comparing sums from different vectors and setting a flag.

Referring now to FIG. 7, the process of generating vectors is set forth. In step 710 current detonation events are determined by monitoring the detonation sensor 330. When the detonation events are greater than the threshold as described in FIG. 6 the detonation events are used to populate the slots within the vectors. The detonation sensor 330 generates changing voltage signal corresponding to sensed events.

In step 712 the current event vector corresponding to the event time is established. That is, the current vector is identified by the time as well as the voltage level of the detonation sensor 330. In step 714 prior detonation event values are carried from previous detonation events and the current detonation event is added to the current event vector. That is, the last event vector voltage values are transferred to the vector and the current event is added thereto. As the vectors are determined the voltages or events within the vector are summed to form a first sum and a second sum.

The first sum corresponds to the sum of the vector or event values corresponding to the first cylinder. The second sum corresponds to the event values in the second cylinder. The sum of all of the event values for vectors in both the first cylinder and second cylinder corresponding to time are summed and compared to a sum threshold. In step 20 when the sum is greater than the threshold a flag is set in the ECU 312. The flag signals the ECU 312 to operate with a second plurality of engine parameters.

Figure 8:
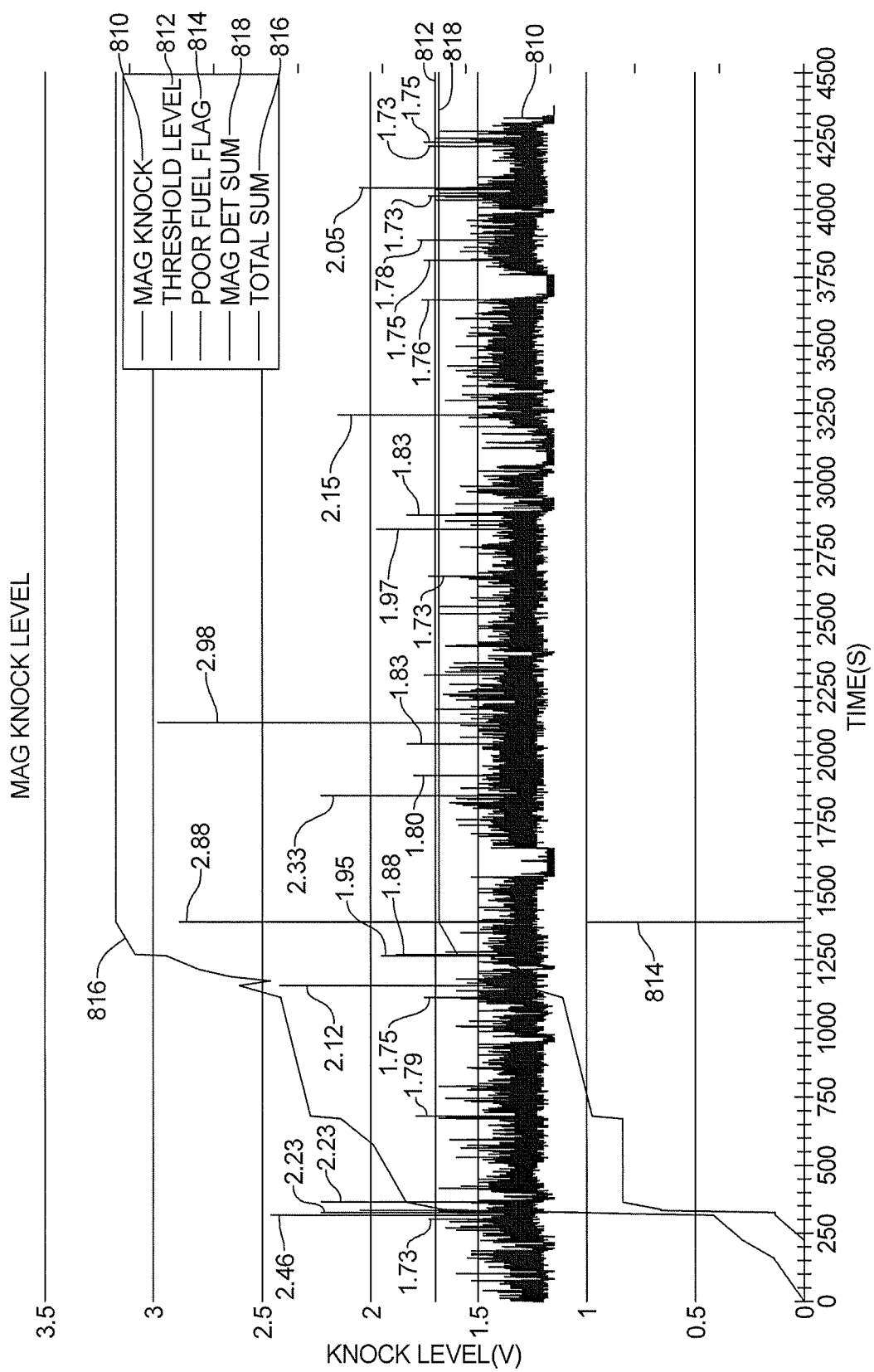
FIG. 8 is a graph of a detonation signal, threshold level, a poor fuel flag, a first cylinder detonation sum and a total sum.

Referring now to FIG. 8 a detonation signal 810 is compared to a threshold level 812. The poor fuel flag 814 is changed to indicate the total sum signal 816 being over a threshold. The sum of the vector events of the first cylinder 318A is also illustrated by signal 818.

Referring now also to FIG. 9, the vector values corresponding to exceeding the threshold level 812 is set forth. In this example the first column has a time 302.7 seconds associated therewith. The threshold value is exceeded and the voltage 1.73 v corresponding to the detonation sensor signal 810 at that time is placed in the first slot or position of the vector.

The column two corresponds to the second detonation signal event exceeding the threshold. As can be seen, voltage from the first detonation exceeding the threshold 1.73 v is carried over in the first slot and the new voltage 2.46 v is added to the second position in the vector. The second event has a time of 317.7 seconds associated therewith. Likewise, the third detonation position is at 326.6 seconds. The previous two values (1.73 v and 2.46 v) are carried forward and the new voltage signal value 2.23 v is added to the vector. At 333.8 seconds a 2.05 voltage value is added to the fourth vector slot. The fifth vector slot has the voltage value 2.23 added to the previous vector. The time vector 682.3 has a voltage value of 1.79 that is added to the previous vector. As can be seen the vectors continue to populate until all the vector values are filled at 1268.8 seconds. Thereafter, the next voltage value is 2.88 this is placed in the first position of the table. Thus, when all the vector positions are filled the next value is added to the top of the vector. Old vectors entries are overwritten to create a rolling summation of varying time domain.

Figure 10:
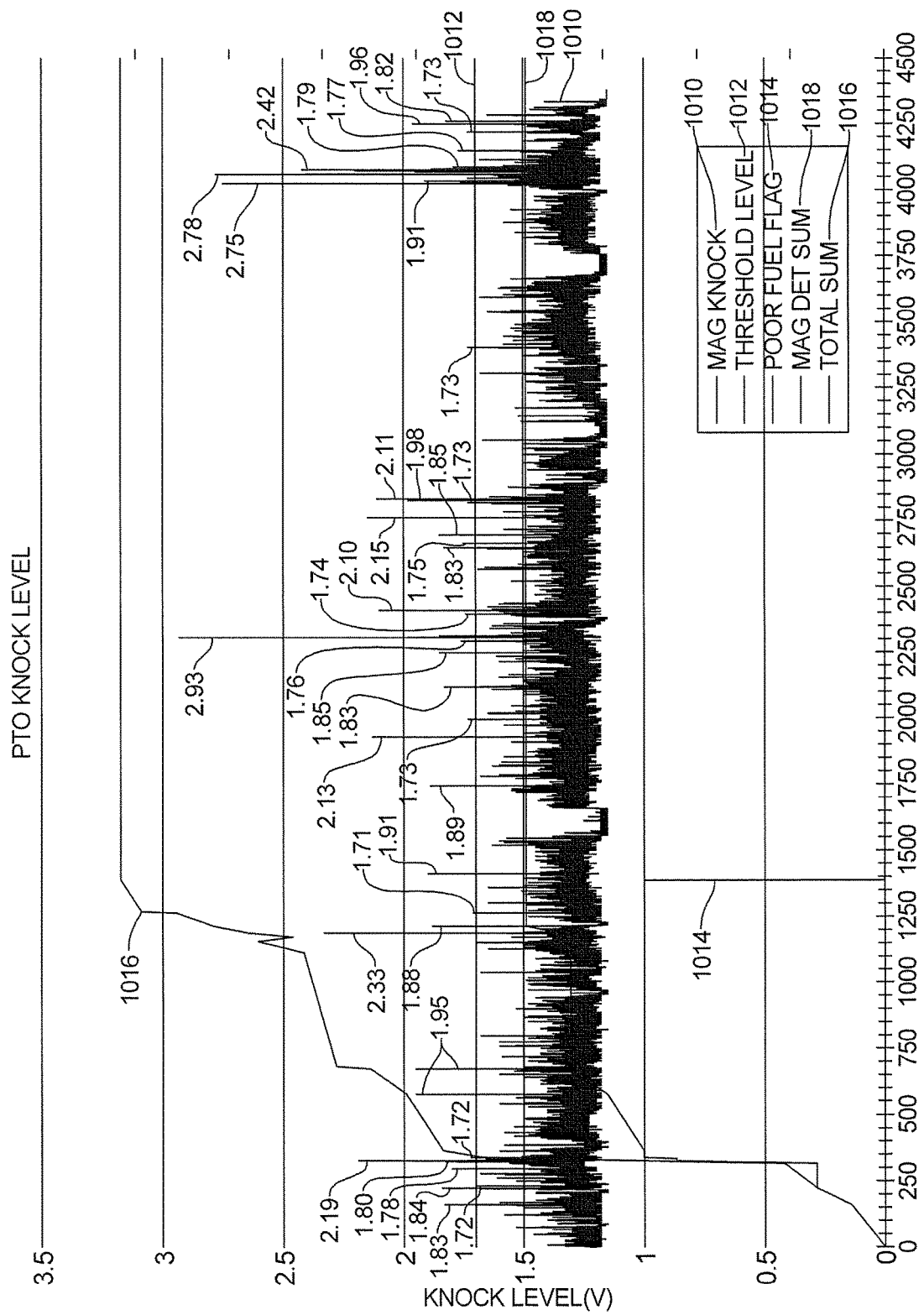
FIG. 10 is a chart illustrating second cylinder detonation signal, a threshold, a poor fuel flag, a second cylinder sum and an overall cylinder sum.

Referring now to FIGS. 10 and 11, the voltage values for a second cylinder 318B of the engine 314 is determined. Recall, the second cylinder detonation is determined by the timing of the pistons 316 as measured by the crankshaft position sensor 408.

The elements for the vectors in FIG. 11 are determined in an identical manner. When voltage values exceed the threshold the values are added to the chart in FIG. 11 at the appropriate vector. That is, the first time the threshold is exceeded is at 159.7 seconds with a detonation signal 1010 voltage of 1.83. The detonation signal 1010, the threshold value 1012, the poor fuel flag 1014, the total sum 1016 and the second cylinder detonation sum 1018 are all illustrated in a similar manner to that set forth above with respect to FIG. 8. It should be noted that FIGS. 10 and 11 illustrate a time between event failures of 500 seconds and therefore the oldest voltage value is replaced with zero. That is, at time 1172.1, the top vector's position or slot in the table is replaced with zero because that is the time at which 500 seconds has passed since the last detonation signal 1010 crossed the threshold 1012. As can be seen at time 1212.4 seconds the zero value is replaced with the next voltage signal that crosses the threshold value.

Referring now to FIG. 12, a combination chart is formed to ultimately generate a combined sum row 1210. The first cylinder sum in row 1212 and the cylinder sums for the vectors are shown in row 1214. The final sum 1210 is the sum of row 1212 and 1214. The columns represent the columns from FIGS. 9 and 11 respectively. However, each column does not correspond directly to a column from the other table. That is, the columns of FIG. 9 do not necessarily line up time-wise with the columns in column 11. Thus, all of the times at which a detonation signal occurs at either the first cylinder or the second cylinder are provided in row 1220. When the time does not correspond to a value from the second cylinder when the first cylinder event is determined or the second cylinder when the first cylinder event is illustrated the vector values are carried over to the right. Thus, vectors from each cylinder are associated prior to summing. For example, at time 333.8 voltage values 1.76, 2.46, 2.23 and 2.05 have been measured. The last voltage threshold crossing for detection signal was 2.05 volts. The next time in either of FIGS. 9 and 11 is 336.8 seconds. However because there is no corresponding value, the values from the vector from 333.8 seconds is moved to the right. At 365.4 seconds a new event occurs for the first cylinder and thus 2.23 volts is added to the next slot. In a similar manner, the timing at 672.1 seconds is static with 1.95 in the last threshold crossing. However, the next three events correspond to cylinder one and thus all of the vector events are carried to the right three more times. At time 1172.1, the oldest value is replaced with zero and all of the values are carried to the right to time 1185.6.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of operating an engine comprising:
    operating the engine with plurality of parameters associated with a first fuel type;
    comparing a detonation signal to a first voltage threshold;
    forming a plurality of vectors by:
    storing detonation signal values that exceed the first voltage threshold, in vector portions as vector values wherein later in time vectors include previous vector values;
    summing vector values for each vector portion to form a plurality of sum values; and
    when one of the plurality of sums values exceeds a sum threshold, changing an engine controller to operate with a second plurality of parameters associated with a second fuel type.

2. The method of claim 1 further comprising, identifying an old vector value from the vector values by comparing the detonation signal values to first time threshold, removing the old vector value from at least one of the vector values.

3. The method of claim 1 wherein the first plurality of parameters comprises a fuel parameter.

4. The method of claim 1 wherein the first plurality of parameters comprises a timing parameter.

5. The method of claim 1 wherein the plurality of sum values are rolling sums.

6. The method of claim 1 wherein the vectors have a plurality of slots, when the slots are filled with vector values replacing earlier vector values with current vector values.

7. The method of claim 1 further comprising changing a flag in response to the sum exceeding the threshold and wherein changing the engine controller to switch comprises changing in response to the flag.

8. A method comprising:
   operating an engine with a first plurality of parameters associated with a first fuel type;
   forming a first plurality of vector portions associated with a first cylinder by:
   storing vector values based on a detonation signal that exceed a voltage threshold in the first plurality of vector portions wherein later in time vector portions include previous vector values, each of the first plurality of vector portions associated having a time associated therewith;
   forming a second plurality of vector portions associated with a second cylinder by:
   storing vector values based on the detonation signal that exceed the voltage threshold in the plurality of second vector portions wherein later in time vector portions include previous vector values;
   associating the first plurality of vector portions and the second plurality of vector portions based on time to form associated pairs;
   summing vector values in the associated pairs form a plurality of sums;
   when one of the plurality of sums exceeds a sum threshold, changing an engine controller to operate with a second plurality of parameters associated with a second fuel type.

9. The method of claim 8 further comprising identifying an old vector value from the first plurality of vector portions by comparing the vector values to first time threshold and removing the old vector value from at least one of the vector values.

10. The method of claim 9 further comprising identifying an old vector value from the second plurality of vector portions by comparing the vector values to first time threshold and removing the old vector value from at least one of the vector values.

11. The method of claim 8 wherein the second plurality of parameters comprises a fuel parameter.

12. The method of claim 8 wherein the second plurality of parameters comprises a timing parameter.

13. The method of claim 8 wherein the plurality of sums are rolling sums.

14. The method of claim 8 wherein the vectors have a plurality of slots, when the slots are filled with old vector values replacing earlier vector values with current vector values.

15. The method of claim 8 further comprising changing a flag in response to the sum exceeding the threshold and wherein changing the engine controller to switch comprises changing in response to the flag.

16. An engine control system comprising:
   a detonation sensor generating a detonation signal;
   a controller coupled to the detonation sensor, said controller programmed to:
   operate an engine with a first plurality of parameters associated with a first fuel type;
   form a first plurality of vector portions associated with a first cylinder by storing vector values based on the detonation signal that exceed a voltage threshold in the first plurality of vector portions wherein later in time vector portions include previous vector values, each of the first plurality of vector portions having a time associated therewith;
   form a second plurality of vector portions associated with a second cylinder by storing vector values based on the detonation signal that exceed the voltage threshold in the plurality of second vector portions wherein later in time vector portions include previous vector values;
   associate the first plurality of vector portions and the second plurality of vector portions based on time to form associated pairs;
   sum vector values in the associated pairs form a plurality of sum values; and
   change the engine controller to switch to a second plurality of parameters associated with a second fuel type when one of the plurality of sums values exceeds a sum threshold.

17. The system of claim 16 wherein the controller is programmed to identify a first old vector value from the first plurality of vector portions by comparing the vector values to first time threshold and removing the old vector value from at least one of the vector values and wherein the controller identifies a second old vector value from the second plurality of vector portions by comparing the vector values to first time threshold and removing the old vector value from at least one of the vector values.

18. The system of claim 16 wherein the second plurality of parameters comprises a fuel parameter and a timing parameter.

19. The system of claim 16 wherein the plurality of sum values are rolling sums.

20. A system comprising:
   a two-stroke engine; and
   an engine control system as recited in claim 16.

* * * * *